United States Patent [19]

Yamaki et al.

[11] 4,285,252

[45] Aug. 25, 1981

[54] SPEED-CHANGE CONTROL SYSTEM FOR AN AUTOMATIC TRANSMISSION

[75] Inventors: Kiyoshi Yamaki; Yoshiro Morimoto, both of Yokohama, Japan

[73] Assignee: Nissan Motor Co., Ltd., Yokohama, Japan

[21] Appl. No.: 60,672

[22] Filed: Jul. 25, 1979

[30] Foreign Application Priority Data

Sep. 5, 1978 [JP] Japan .............................. 53/108041

[51] Int. Cl.³ ...................... B60K 41/04; B60K 41/06
[52] U.S. Cl. ......................................... 74/866; 74/862
[58] Field of Search ................ 74/866, 843, 856, 861, 74/862, 863, 864, 752 D, DIG. 6

[56] References Cited

U.S. PATENT DOCUMENTS

| | | | |
|---|---|---|---|
| 3,662,625 | 5/1972 | Wakamatsu et al. ................ | 74/866 |
| 3,673,400 | 6/1972 | Ito ...................................... | 74/752 D |
| 3,776,048 | 12/1973 | Enomoto et al. ....................... | 74/866 |
| 3,826,158 | 7/1974 | Flaig .................................. | 74/752 D |
| 3,881,368 | 5/1975 | Furuhashi et al. .................... | 74/866 |
| 3,903,759 | 9/1975 | Hashimoto .......................... | 74/752 D |
| 3,938,409 | 2/1976 | Uozumi .............................. | 74/856 X |
| 3,956,947 | 5/1976 | Leising et al. ......................... | 74/866 |
| 4,131,036 | 12/1978 | Ivey et al. .............................. | 74/866 |

FOREIGN PATENT DOCUMENTS

2742031  3/1979  Fed. Rep. of Germany ............. 74/866

*Primary Examiner*—Leslie Braun
*Attorney, Agent, or Firm*—Thompson, Birch, Gauthier & Samuels

[57] ABSTRACT

A speed-change control system for an automatic transmission includes a vehicle speed sensor, an engine load sensor, speed change program memory circuits, a comparator for comparing signals from the sensors with signals from the memory circuit, and a speed change control circuit for producing a signal for changing the transmission into a determined speed position in response to an output from the comparator.

According to the invention the control system comprises a differentiation unit for differentiating the signal from the vehicle speed sensor to produce a signal corresponding to an actual acceleration, a programmed acceleration memory circuit for storing programmed accelerations obtained corresponding to the signals from the engine load sensor at every speed positions to produce signals corresponding to the programmed accelerations, and means for changing the speed change programs in response to differences between the signals corresponding to the actual acceleration and to the programmed acceleration, thereby automatically selecting a speed change program suitable for a grade of a road and a loaded condition without a troublesome hand operation of a switch for selecting a speed change program by a driver.

4 Claims, 12 Drawing Figures

FIG_5
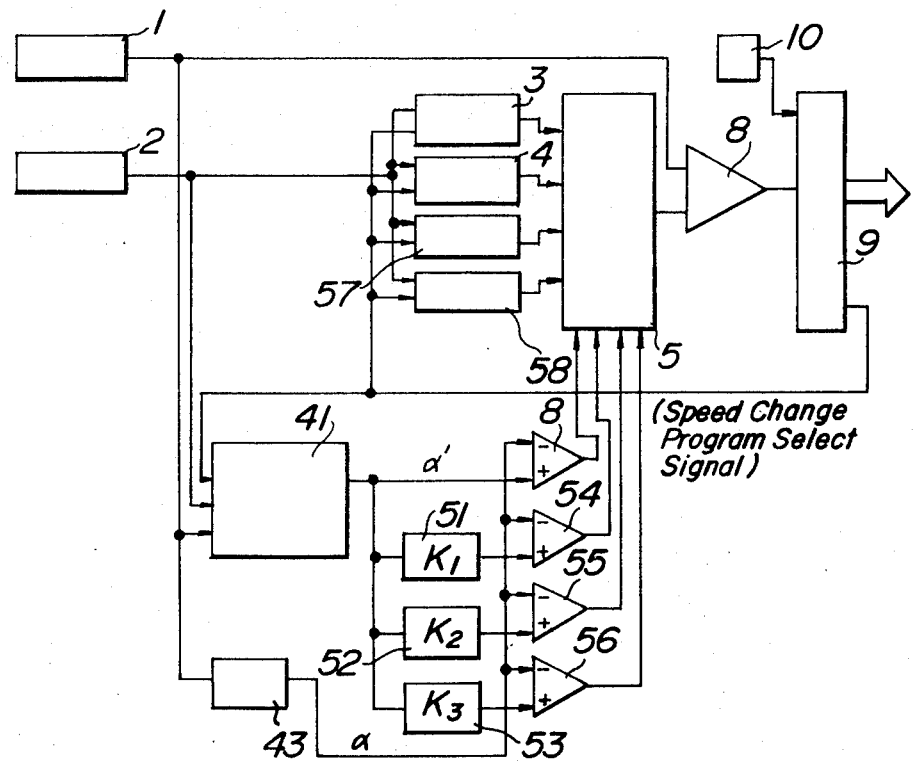
(Speed Change Program Select Signal)
FIG_6
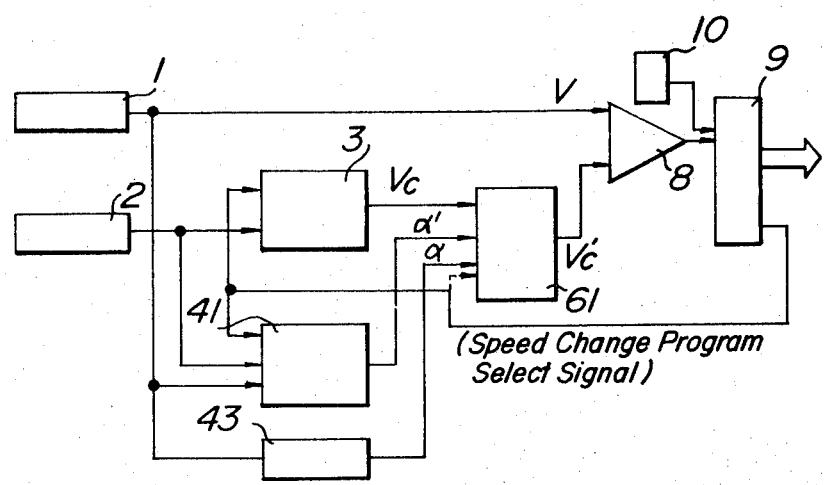
(Speed Change Program Select Signal)

SPEED-CHANGE CONTROL SYSTEM FOR AN AUTOMATIC TRANSMISSION

BACKGROUND OF THE INVENTION

1. Field of the Invention

The present invention relates to a speed-change control system for an automatic transmission including a vehicle speed sensor for electrically detecting vehicle speeds, an engine load sensor for detecting engine loads and an electronic circuit to which are supplied outputs from the sensors and comparing these outputs with predetermined relations between these outputs to produce signals for instructing speed changes.

2. Description of the Prior Art

An automatic transmission of this kind as shown in FIG. 1 has been suggested, wherein a vehicle speed sensor 1 detects revolutions of an output shaft of the transmission to produce actual vehicle speed signals which are proportional to actual vehicle travelling speeds.

An engine load sensor 2 detects loads of an engine to generate signals corresponding to the loads. In effect, the sensor 2 may be a conventional throttle opening sensor for generating signals proportional to opened degrees of a throttle of the engine or a conventional negative pressure sensor for generating signals proportional to negative pressures in an intake duct of the engine, which may be selected as the case may be. In the following explanation with respect to the prior art and embodiments of the invention, the throttle opening sensor is used as the engine load sensor.

Speed change program memory circuits 3 and 4 are supplied with the engine load signals from the engine load sensor 2 and produce reference change speed signals representing vehicle speeds which are suitable for the engine loads by means of a predetermined engine load-speed change reference program. The speed change program memory circuits 3 and 4 store the engine load-speed change reference programs as shown in FIG. 2, respectively.

With the program shown in FIG. 2 illustrating an example of an automatic transmission having three speed positions, the graph includes 2 to 1 down-shift program 21, 1 to 2 up-shift program 22, 3 to 2 down-shift program 23 and 2 to 3 up-shift program 24.

As shown in FIG. 2, for example as to 2 to 1 down-shift program 21 and 1 to 2 up-shift program 22, reference change speeds $V_D$ and $V_U$ are determined for the same throttle opening $\theta_1$, respectively. The reference up-shift change speed $V_U$ is set on the side higher than the reference down-shift change speed $V_D$. The difference between the reference speeds $V_U$ and $V_D$ serves as a hysteresis to obtain a stable speed change. The same holds true in case of the 3 to 2 down-shift program 23 and the 2 to 3 up-shift program 24.

The speed change memory circuits 3 and 4 are supplied with program select signals later described to select associated programs in first, second and third speed ranges as shown in FIGS. 3a–3c among the stored speed change programs. FIGS. 3a–3c illustrate the selected programs when the transmission is in first, second and third speed positions, respectively. When the transmission is in the second speed position in FIG. 3b, the 2 to 1 down-shift program 21 and the 2 to 3 up-shift program 24 are alternately selected by a control of time division by means of clock pulses from a pulse generator 10. (These operations will be explained later).

The speed change program memory circuits 3 and 4 store respective different programs. The memory circuit 3 stores a speed change program which produces lower reference change speed signals for the same throttle opening suitable for travelling on a flat road and the memory circuit 4 stored a speed change program which produces higher reference change speed signals for the same throttle opening suitable for an uphill road.

A multiplexer 5 selects any one of reference change speed signals received from the speed change program memory circuits 3 and 4 by means of an inclined angle sensor 6 or a program change-over switch 7 later described, which selected reference change speed signal is then supplied to a comparator 8.

The inclined angle sensor 6 produces signals proportional to inclined angles of roads in a travelling direction of the vehicle. If the signal exceeds a determined value, the reference change speed signal from the speed change program memory circuit 4 is supplied through the multiplexer 5 to the comparator 8. The program change-over switch 7 is manually operated by a driver to generate a signal which is applied to the multiplexer 5 for selecting the speed change program memory circuit 3 or 4.

The comparator 8 compares the signal proportional to an actual vehicle speed from the vehicle speed sensor 1 and the reference change speed signal received through the multiplexer 5 to produce a high level signal H when the actual vehicle speed signal is greater than the reference change speed signal and to produce a low level signal L when the actual vehicle speed signal is smaller.

A speed change control circuit 9 receives the output signals H and L of the comparator 8 to control an energization and deenergization of a plurality of solenoid valves for controlling operations of a clutch and a brake which serve to change over connected relations of a sun gear, a carrier and a ring gear of a planetary gear unit to determined speed positions of the transmission. Furthermore, the speed change control circuit 9 supplies the program select signals to the speed change program memory circuits 3 and 4 to select the relevant speed change program as above described referring to FIGS. 3a–3c.

When the transmission is in the second speed position, the speed change control circuit 9 alternately produces program select signals for selecting the 2 to 1 down-shift speed change program 21 and the 2 to 3 up-shift speed change program 24. The transmission is kept in the second speed position, if the output of the comparator 8 is the H signal when the program select signal for selecting the speed change program 21 is produced and if the output of the comparator 8 is the L signal when the program select signal for selecting the speed change program 24 is produced. If the output of the comparator 8 does not correspond to the above program select signals, the speed change control circuit 9 operates to change the solenoid to be energized for changing the transmission into the first or third speed position, with the result that the speed change control circuit 9 produces the program select signal for selecting the speed change program 22 or 23 as shown in FIGS. 3a or 3c.

With this arrangement of the prior art, the speed change program corresponding to a speed position is selected by the program select signal and the signal from the throttle opening sensor 2 corresponding to an engine load determines a reference change speed with which an actual vehicle speed sensed in the vehicle speed sensor 1 is compared to select the up-shift or down-shift for a suitable speed change.

With this arrangement, however, a driver must select the program memory circuit 3 or 4 in consideration to a grade of a road by a manual operation of the program change-over switch 7 which is troublesome. On the other hand, the inclined angle sensor 6 does not detect the change in weight of load on the vehicle. If the speed change program memory circuit 4 is set to store a speed change program the most suitable for a heavy load on an uphill road, the speed change program memory circuit 4 is selected even when the vehicle is under a slightly loaded condition, so that the up-shift of the transmission is not readily effected.

SUMMARY OF THE INVENTION

It is an object of the invention to provide a speed-change control system for an automatic transmission which overcomes the above disadvantages of the prior art.

It is another object of the invention to provide a speed-change control system for an automatic transmission which automatically selects a speed change program suitable for a grade of a road and a loaded condition.

It is further object of the invention to provide a speed-change control system for an automatic transmission which is capable of changing speed change programs in response to a difference between an actual acceleration and a programmed acceleration obtained from an engine load and a speed position of the transmission.

The speed change control system for an automatic transmission including a vehicle speed sensor for producing signals corresponding to vehicle speeds, an engine load sensor for generating signals corresponding to engine loads, at least one speed change program memory circuit storing speed change programs including reference change speeds corresponding to the signals from the engine load sensor and generating signals corresponding to said reference change speeds, a comparator for comparing the signal from the vehicle speed sensor with a signal depending upon the signal corresponding to said reference change speed from said speed change program memory circuit, and a speed change control circuit for producing a signal for changing said transmission into a determined speed position in response to an output from said comparator, according to the invention comprises a differentiation unit for differentiating the signal from the vehicle speed sensor to produce a signal corresponding to an actual acceleration, a programmed acceleration memory circuit for storing programmed accelerations obtained corresponding to the signals from said engine load sensor at every speed positions to produce signals corresponding to said programmed accelerations, and means for changing said speed change programs in response to differences between the signals corresponding to said actual acceleration and to said programmed acceleration.

The invention will be more fully understood by referring to the following detailed specification and claims taken in connection with the appended drawings.

BRIEF DESCRIPTION OF THE DRAWINGS

FIG. 5 is a block diagram showing a second embodiment of the invention;

FIG. 6 is a block diagram showing a third embodiment of the invention;

DETAILED DESCRIPTION OF THE PREFERRED EMBODIMENTS

Figure 1:
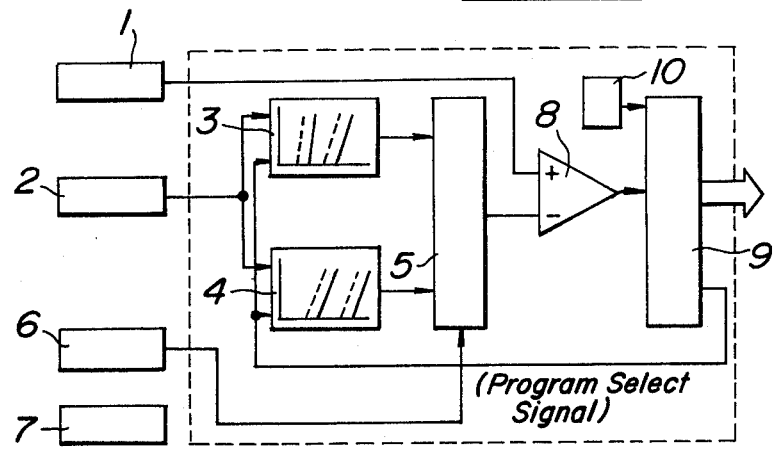
FIG. 1 is a block diagram showing a control system of the prior art as described above.
Figure 3A:
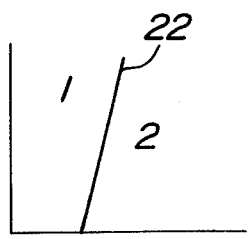
FIGS. 3a–3c are program diagrams to be selected when a transmission is in respective speed positions as described above.
Figure 3B:
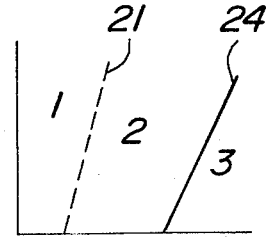
Figure 3C:
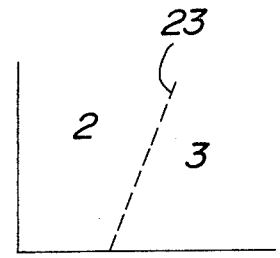
Figure 4:
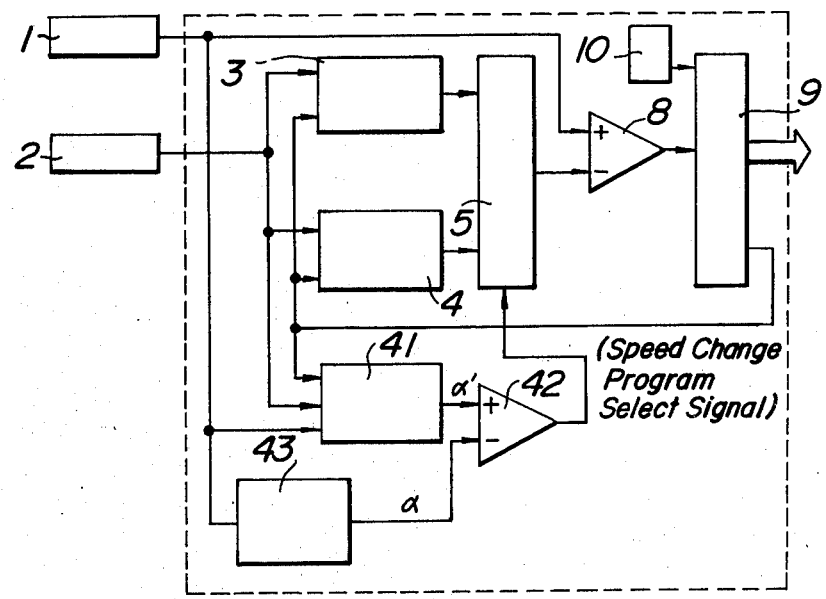
FIG. 4 is a block diagram illustrating one embodiment of the present invention.

Referring to FIG. 4 illustrating one embodiment of the invention wherein the same reference numerals have been utilized to identify the like parts in FIGS. 1 and 3, a programmed acceleration memory circuit 41 receives program select signals from a speed change control circuit 9, signals from a throttle open sensor 2 corresponding to throttle opening and signals from a vehicle speed sensor 1 corresponding to actual vehicle speeds and stores reduction ratios at respective speed positions of a transmission and accelerations corresponding to throttle openings determined at actual vehicle speeds at respective reduction ratios for example on a flat road.

The programmed acceleration memory circuit 41 receives the program select signals, the actual vehicle speed signals and signals corresponding to the throttle opening and produces signals corresponding to accelerations $\alpha'$ determined for example on the flat road by applying the program select signals to the respective speed positions. Such an acceleration $\alpha'$ will be referred to as "programmed" acceleration, hereinafter.

A comparator 42 compares a signal corresponding to the programmed acceleration $\alpha'$ with a signal corresponding to an actual acceleration $\alpha$ obtained by differentiating an output (actual vehicle speed) of the vehicle speed sensor 1 by means of a differentiation circuit 43 and produces a high level signal H when the programmed acceleration $\alpha'$ is greater than the actual acceleration $\alpha$ and a low level signal L when the programmed acceleration $\alpha'$ is smaller.

The H and L signals from the comparator 42 are supplied to a multiplexer 5. The multiplexer 5 receives the L signal to select a speed change program memory circuit 3 which has stored a speed change program wherein a reference change speed suitable for travelling on a flat road is set at a low value, on the other hand the multiplexer 5 receives the H signal to select a speed change program memory circuit 4 which has stored a speed change program wherein a reference change speed suitable for travelling on an uphill road is set at a high value.

For example, the speed change program memory circuit 4 stores a speed change program the most suitable for an uphill road more than 5% grade and the programmed acceleration circuit 41 stores accelerations corresponding to the throttle openings, vehicle speeds and respective speed positions for an uphill road of a 5% grade. With this arrangement, a comparison of a programmed acceleration $\alpha'$ with an actual acceleration $\alpha$ can determine whether the grade of a road on which a vehicle travels is more than 5% to select a suitable speed change program automatically. In setting the speed change programs to be stored in the speed change program memory circuits 3 and 4, various grades such as 10 or 15% can be selected as the case may be. The number of the speed change program memory circuits may not be necessarily two but may be more than three. In this case, a plurality of the programmed acceleration memory circuits may be provided corresponding to a plurality of the speed change program memory circuits and grades.

FIG. 5 illustrates another embodiment of the invention wherein without providing the same number of the programmed acceleration memory circuits as that of the speed change program memory circuits, the fewer acceleration memory circuits sufficiently operate for the much speed change program memory circuits. In addition to the comparator 8 for comparing signals corresponding to programmed accelerations $\alpha'$ from the programmed acceleration memory circuit 41 with signals corresponding to actual accelerations $\alpha$ from the differentiation circuit 43, there are provided adders 51, 52 and 53 for adding the signals corresponding to the programmed accelerations $\alpha'$ with constants $K_1$, $K_2$ and $K_3$, comparators 54, 55 and 56 to which are supplied signals added with the constants $K_1$, $K_2$ and $K_3$ and speed change program memory circuits 57 and 58 in addition to 3 and 4 correspondingly to the comparators 54, 55 and 56.

The constants $K_1$, $K_2$ and $K_3$ become progressively larger values. Accordingly, the signals supplied to the comparators 8, 54, 55 and 56 correspond to the programmed accelerations which are progressively higher values. Namely, the comparator 8 detects the lowest programmed accelerations $\alpha'$ for example obtained on a 15% grade uphill road, the comparator 56 to which are supplied the signals added with the largest constants $K_3$ detects the highest programmed accelerations for example obtained on a flat road, and the comparator 54 or 55 detects the intermediate programmed accelerations for example obtained on 10% or 5% grade uphill road. The speed change program memory circuits 3, 4, 57 and 58 store the speed change programs optimum for 15, 10, 5 and 0% grade roads, respectively.

The multiplexer 5 is adapted to select the speed change program memory circuit 4 optimum for a 10% grade uphill road when the actual acceleration $\alpha$ is more than $\alpha'+K_1$ and less than $\alpha'+K_2(\alpha'+K_1<\alpha<\alpha'+K_2)$, that is, when the comparators 8 and 54 produce the L signals and the comparators 55 and 56 produce the H signals.

In the same manner, the multiplexer 5 is adapted to select the speed change program memory circuits 3, 57 and 58, respectively, when the actual acceleration $\alpha$ are in the relations, $\alpha'<\alpha<\alpha+K_1$, $\alpha'+K_2<\alpha<\alpha'+K_3$ and $\alpha'+K_3<\alpha$.

With this arrangement according to the invention, the single programmed acceleration memory circuit sufficiently serves to select a plurality of speed change program memory circuit, so that the memory capacity for this circuit can be advantageously saved.

It is understood that although the embodiment shown in FIG. 5 has been explained with respect to the selection of the speed change programs suitable for the various grades of uphill roads, it may of course be applied to speed change programs for downhill roads.

Referring to FIG. 6 illustrating a third embodiment of the invention, wherein the same reference numerals in FIG. 1 have been used to identify like parts which will not be described in further detail, one speed change program memory circuit is utilized to change a speed change program continuously without selectively using a plurality of speed change program memory circuits, to save the memory capacity used for the speed change program memory circuit.

Figure 2:
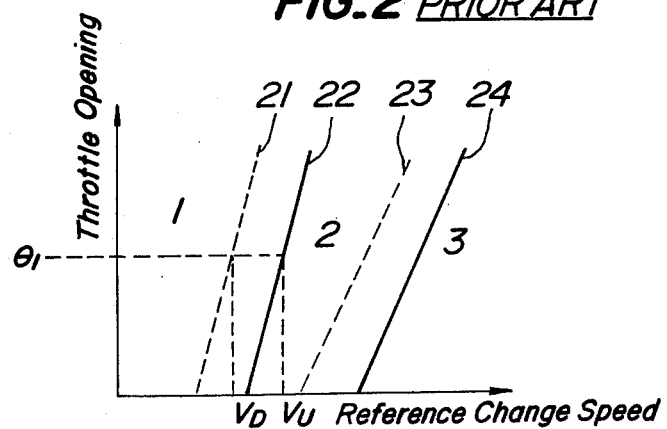
FIG. 2 shows a speed change program with coordinates of throttle opening and reference change speed as described above.

In the third embodiment, one speed change program memory circuit is provided which is equivalent to, for example, the speed change program memory circuit 3 optimum for a flat road as shown in FIG. 2. To an arithmetic unit 61 are supplied signals $V_C$ corresponding to the reference change speed from the speed change program memory circuit 3, signals corresponding to programmed accelerations $\alpha'$ from the acceleration memory circuit 41 and signals corresponding to actual accelerations $\alpha$ from the differentiation circuit 43.

From an arithmetic unit 61 to the comparator 8 is applied a signal corresponding to values $V_C'$ which is a reference change speed $V_C$ plus a value proportional to a difference between a programmed acceleration and an actual acceleration ($V_C'=V_C+A(\alpha'-\alpha)$, where A is a constant).

The comparator 8 compares the signal from the vehicle speed sensor 1 corresponding to the actual vehicle speed V with the signal corresponding to the $V_C'$ to produce an H signal when the actual speed V is more than V' or an L signal when the actual speed V is less than V' according to which signal the speed change control circuit 9 causes the transmission to up-shift or down-shift.

Figure 7:
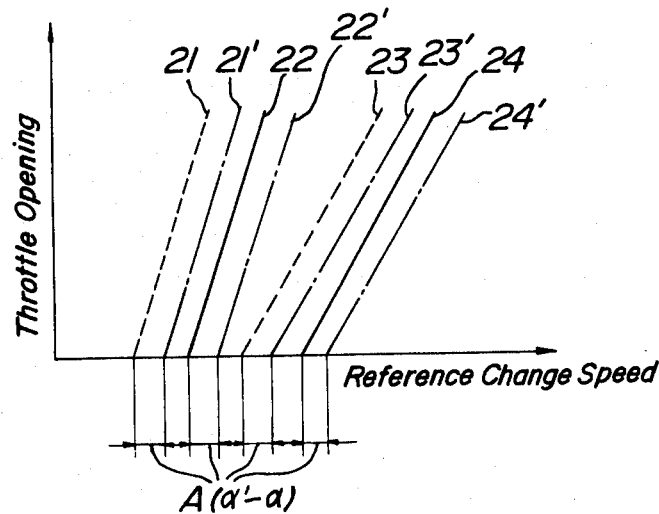
FIG. 7 shows a speed change program with coordinates of throttle opening and reference change speed according to the invention.

Accordingly, for example, with the speed change program stored in the speed change program memory circuit 3 as shown in FIG. 2, the up-shift speed change programs 22 and 24 and the down-shift speed change programs 21 and 23 are shifted by $A(\alpha'-\alpha)$ toward the higher vehicle speed side as shown in dot-and-dash lines in FIG. 7. It is, therefore, possible for only one speed change memory circuit to obtain various reference change speeds in this manner.

Moreover, it can also be constructed that as shown in dash lines in FIG. 6, the speed change program select signal is also supplied to the arithmetic unit 61 and only when the speed change program select signal is to select the up-shift speed change program the arithmetic unit operates to obtain the above described $V_C'$ and hence the up-shift speed change program as shown at 22' and 24' in FIG. 7. When the speed change program select signal is to select the down-shift speed change program, the arithmetic unit does not operate to obtain the $V_C'$.

Figure 8:
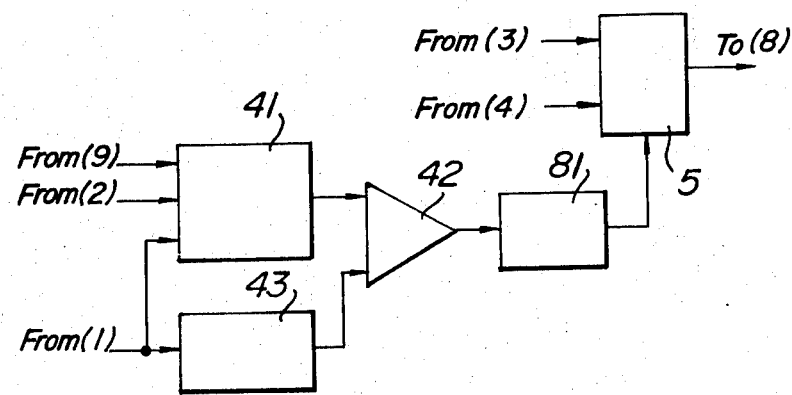
FIG. 8 is a block diagram illustrating a fourth embodiment of the invention.

FIG. 8 illustrates a main part of a fourth embodiment of the invention, wherein only when an acceleration continues for more than a determined time, a speed change program is changed to avoid too frequent changes of the speed change program due to unevenness of a road. The fourth embodiment applied to the first embodiment in FIG. 4 will be explained. However, it may of course be applied to the second and third embodiments.

Figure 9:
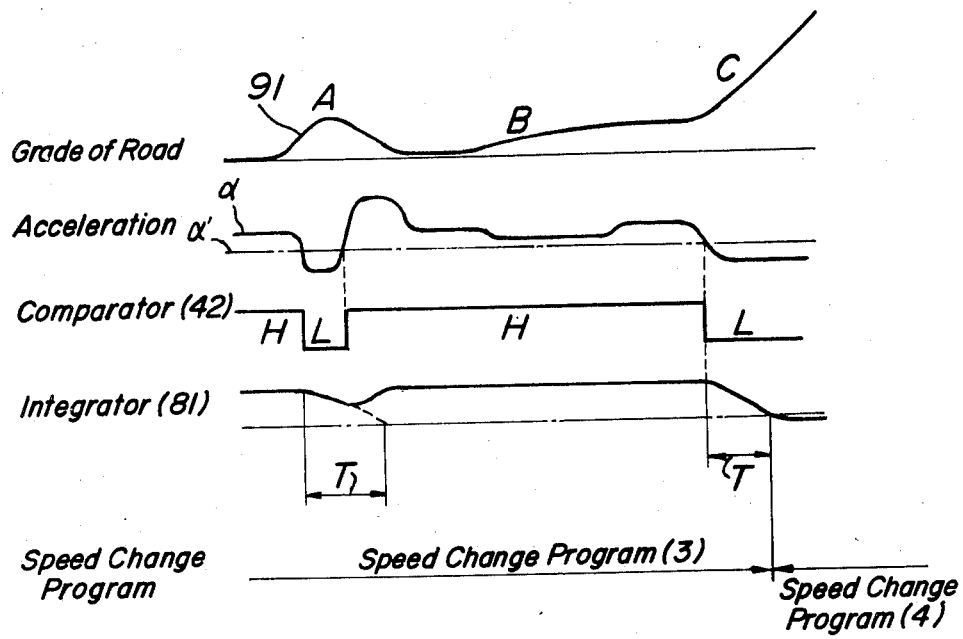
FIG. 9 is diagrams for explaining the operation of the system shown in FIG. 8.

As can be seen from FIG. 8, between the comparator 42 and the multiplexer 5 is provided an integrator 81 as a time delay element. Referring to FIG. 9, the actual acceleration α varies into positive or negative according to the variation in grade 91 on a road. Assuming that the programmed acceleration α' is constant because of a constant opening of the throttle and an unvarying program select signal for the sake of clarity, the integrator 81 generates an L signal at points A and C but does not generate an L signal at a point B.

The integrator 81, however, produces an L signal at the point A for a short period of time which is shorter than a time constant of the integrator 81, so that the change-over of the speed change program memory circuit by the multiplexer 5 is not effected and hence the speed change program memory circuit 3 is unaltered. After the L signal has continued at the point C for a time longer than the time constant of the integrator 81, the output of the integrator 81 becomes less than the threshold of the multiplexer 5 to select the speed change program memory circuit 4.

Figure 10:
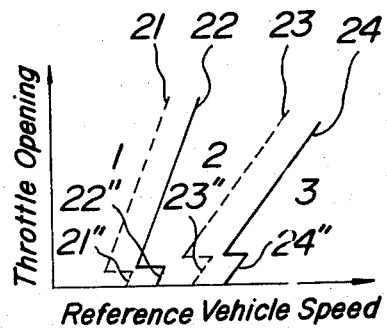
FIG. 10 shows a speed change program with coordinates of throttle opening and reference change speed according to the invention.

In the above explanations, the speed change programs have been described as indicated in straight lines as shown in FIGS. 2, 3 and 7. However, the speed change programs are not limited to rectilinear ones and various kinds of speed change programs can be stored in the speed change program memory circuit as the case may be. For example, there may be provided speed change programs as shown in FIG. 10 to be selected depending upon accelerations when throttle opening is zero or slight, thereby automatically obtaining a suitable engine brake when travelling on a downhill road.

As above described as to the embodiments of the present invention, the speed change programs can be changed in response to a difference between an actual acceleration and a programmed acceleration determined an engine load and a speed position of the transmission without a troublesome hand operation of a switch for selecting a speed change program by a driver. Moreover, the control system of the invention has an advantage in that the speed change programs can be automatically changed without using a grade angle sensor, once optimum speed change programs dependent upon grades of roads have been set. Furthermore, the control system according to the invention has an advantage in that as the speed change programs are changed in comparison of an actual acceleration with a programmed acceleration, the change of the speed change programs can be achieved in case of variation in grade of roads as well as loaded conditions on a vehicles, and in the event of a misfiring or a lowered output of an engine when travelling on highlands.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a speed change control system for an automatic transmission including a vehicle speed sensor for producing signals corresponding to vehicle speeds, an engine load sensor for generating signals corresponding to engine loads, at least one speed change program memory circuit storing speed change programs including reference change speeds corresponding to the signals from the engine load sensor and generating signals corresponding to said reference change speeds, a comparator for comparing the signal from the vehicle speed sensor with a signal depending upon the signal corresponding to said reference change speed from said speed change program memory circuit, and a speed change control circuit for producing a signal for changing said transmission into a determined speed position in response to an output from said comparator, the improvement comprising a differentiation unit for differentiating the signal from the vehicle speed sensor to produce a signal corresponding to an actual acceleration, a programmed acceleration memory circuit for storing programmed accelerations obtained corresponding to the signals from said engine load sensor at every speed position to produce signals corresponding to said programmed accelerations, and means for changing said speed change programs in response to differences between the signals corresponding to said actual acceleration and to said programmed acceleration.

2. A speed change control system as set forth in claim 1, wherein there are provided a plurality of said speed change program memory circuits and said means for changing said speed change programs comprise a second comparator for comparing signals corresponding to said actual acceleration with signals corresponding to said programmed acceleration and a multiplexer for changing over said plurality of speed change program memory circuits to connect to said first mentioned comparator, said multiplexer being operated in response to the output from the second comparator to select one of said speed change program memory circuits.

3. A speed change control system as set forth in claim 1, wherein there are provided a plurality of said speed change program memory circuits and said means for changing said speed change programs comprises a plurality of adders for adding said signals corresponding to the programmed accelerations with respective different constants, a plurality of additional comparators for comparing said signals corresponding to said actual accelerations with the signals corresponding to the programmed accelerations added with said constants and a multiplexer for changing over said plurality of speed change program memory circuits to connect to said first mentioned comparator, and in response to the output of said additional comparators said multiplexer selects the corresponding speed change program memory circuit.

4. A speed change control system as set forth in claim 1, wherein said means for changing said speed change program comprises an arithmetic circuit to which are supplied the signals corresponding to said reference change speeds, to said programmed accelerations and to said actual accelerations and producing signals corresponding to programmed vehicle speeds in response to differences between said signals corresponding to said programmed accelerations and to said actual accelerations, and said signals corresponding to said actual vehicle speeds and to programmed vehicle speeds are supplied to said first mentioned comparator.

* * * * *